United States Patent
Zhang et al.

(10) Patent No.: US 11,301,029 B2
(45) Date of Patent: Apr. 12, 2022

(54) METHOD, APPARATUS, AND SYSTEM FOR ALLOCATING POWER TO GRAPHICS PROCESSING UNIT

(71) Applicant: Huawei Technologies Co., Ltd., Shenzhen (CN)

(72) Inventors: Xu Zhang, Xi'an (CN); Lu Gao, Shanghai (CN); Yunghsin Chu, Taiwan (CN); Kun Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/079,917

(22) Filed: Oct. 26, 2020

(65) Prior Publication Data
US 2021/0041937 A1   Feb. 11, 2021

Related U.S. Application Data

(63) Continuation of application No. PCT/CN2018/085192, filed on Apr. 28, 2018.

(51) Int. Cl.
| | |
|---|---|
| *G06F 1/26* | (2006.01) |
| *G06F 1/32* | (2019.01) |
| *G06F 1/3296* | (2019.01) |
| *G06F 1/3228* | (2019.01) |
| *G06F 1/3234* | (2019.01) |
| *G06F 9/50* | (2006.01) |
| *G06T 1/20* | (2006.01) |

(52) U.S. Cl.
CPC .......... *G06F 1/3296* (2013.01); *G06F 1/3228* (2013.01); *G06F 1/3243* (2013.01); *G06F 9/5094* (2013.01); *G06T 1/20* (2013.01)

(58) Field of Classification Search
CPC .................................................. G06F 1/3296
See application file for complete search history.

(56) References Cited

U.S. PATENT DOCUMENTS

| | | | |
|---|---|---|---|
| 8,284,205 B2 | 10/2012 | Miller et al. | |
| 9,589,533 B2 * | 3/2017 | Banski | G09G 5/006 |
| 2006/0232590 A1 * | 10/2006 | Bakalash | G06F 9/505 |
| | | | 345/502 |

(Continued)

FOREIGN PATENT DOCUMENTS

| | | |
|---|---|---|
| CN | 104115093 A | 10/2014 |
| CN | 105378824 A | 3/2016 |

(Continued)

*Primary Examiner* — Mohammed H Rehman
(74) *Attorney, Agent, or Firm* — Conley Rose, P.C.

(57) ABSTRACT

An apparatus, a system, and a method for allocating power to a graphics processing unit, where the apparatus includes a frame rate detection module configured to detect a frame rate of current image data to-be-displayed, and a power allocation module configured to: determine whether the frame rate is lower than a preset frame rate threshold; if the frame rate is lower than the preset frame rate threshold, determine that displaying of the image data is in a frame freezing state; determine, in response to the frame freezing state, whether a graphics processing unit reaches a power bottleneck state; and if determining that the graphics processing unit reaches the power bottleneck state, increase power of the graphics processing unit and reduce power of another module related to the displaying.

20 Claims, 5 Drawing Sheets

(56) References Cited

U.S. PATENT DOCUMENTS

| | | | |
|---|---|---|---|
| 2013/0159741 A1 | 6/2013 | Schluessler et al. | |
| 2014/0002730 A1* | 1/2014 | Thomson | G06F 1/3206 348/441 |
| 2014/0164757 A1* | 6/2014 | Dorsey | G06T 1/20 713/100 |
| 2014/0359324 A1 | 12/2014 | Park et al. | |
| 2015/0019715 A1* | 1/2015 | Ronen | H04W 4/60 709/224 |
| 2017/0330496 A1* | 11/2017 | Oravainen | A63F 13/5255 |

FOREIGN PATENT DOCUMENTS

| | | |
|---|---|---|
| CN | 106681833 A | 5/2017 |
| CN | 107463481 A | 12/2017 |

\* cited by examiner

METHOD, APPARATUS, AND SYSTEM FOR ALLOCATING POWER TO GRAPHICS PROCESSING UNIT

CROSS-REFERENCE TO RELATED APPLICATIONS

This application is a continuation of International Patent Application No. PCT/CN2018/085192, filed on Apr. 28, 2018, the disclosure of which is hereby incorporated by reference in its entirety.

TECHNICAL FIELD

This application relates to the field of electronic technologies, and in particular, to a method, an apparatus, and a system for allocating power to a graphics processing unit.

BACKGROUND

With continuous development of image processing technologies, image processing capabilities of various devices such as a mobile terminal, a computer, and a server are greatly improved. In this way, better user experience can be provided in applications involving a large amount of image processing, such as games, playing of high-definition videos, image editing, and drawing. For example, as communications technologies are evolving rapidly and mobile terminals are growing explosively, a mobile terminal such as a mobile phone or a tablet computer can provide more help for a user in life, work, entertainment, and the like. This imposes an increasingly high requirement on performance of the mobile terminal. Especially in entertainment, due to convenience of the mobile terminal and fragmentation of user time, more users use the mobile terminal to play games or play high-definition videos.

Resulting from a relatively small size, the mobile terminal easily generates excessive heat when a large-scale game application runs. Therefore, moderate temperature control needs to be performed on the mobile terminal, for example, total output power of a system is reduced to lower a temperature of the mobile terminal. However, after the total output power of the system is reduced, a graphics processing unit (GPU) closely related to a game running effect may be in a power bottleneck state. In the power bottleneck state, input power of the GPU is relatively low, and the GPU cannot meet a requirement for smooth running of a game application, resulting in a low frame rate and even frame freezing during running of the game application. Consequently, the game application runs un-smoothly, and user experience is poor. This case is also very common on other devices. Similar problems also exist in other applications for which the graphics processing unit needs to be used, in addition to games.

SUMMARY

To resolve the foregoing technical problem, embodiments of this application provide an apparatus, a system, and a method for allocating power to a graphics processing unit, to improve an image displaying effect.

According to a first aspect, an embodiment of this application provides an apparatus for allocating power to a graphics processing unit. The apparatus may include a frame rate detection module configured to detect a frame rate of current image data to-be-displayed. The apparatus may also include a power allocation module configured to: determine whether the frame rate is lower than a preset frame rate threshold; if the frame rate is lower than the preset frame rate threshold, determine that displaying of the image data is in a frame freezing state; determine, in response to the frame freezing state, whether a graphics processing unit reaches a power bottleneck state; and if determining that the graphics processing unit reaches the power bottleneck state, increase power of the graphics processing unit and reduce power of another module related to the displaying. In this solution, power re-allocation can be performed properly to improve performance of the graphics processing unit.

In a possible implementation, a sum of the power of the graphics processing unit and the power of the other module related to the displaying does not exceed a preset power upper limit. Optionally, the preset power upper limit is determined by a battery temperature, system temperature, or board temperature of the apparatus that is collected by a sensor. In this solution, when total system power is limited, power re-allocation can be performed to alleviate the power bottleneck state of the graphics processing unit.

In a possible implementation, the other module includes at least one of a control processor, another processor, or a memory. In this solution, power re-allocation can be performed on different components to balance system performance.

In a possible implementation, when determining whether the graphics processing unit reaches the power bottleneck state, the power allocation module is configured to: compare a bound measure bound measure value of the graphics processing unit with a preset threshold; and when the bound measure value reaches the preset threshold, determine that the graphics processing unit reaches the power bottleneck state. The bound measure value is a parameter used to measure a load status of the graphics processing unit. This solution can be used together with frame rate detection to further accurately determine that the graphics processing unit reaches the power bottleneck state.

In a possible implementation, the apparatus further includes: an information saving module configured such that when it is determined that the displaying of the image data is in the frame freezing state, the information saving module records frame freezing scenario information. The frame freezing scenario information includes an execution time of an open graphics library (OpenGL) application programming interface (API) of a driver of the graphics processing unit, hardware counter hardware counter information, and open graphics library draw call OpenGL draw call. The frame freezing scenario information saved using this solution helps research and development personnel analyze a frame freezing scenario.

In a possible implementation, the apparatus further includes a frame freezing scenario information saving enabling/disabling module configured to: receive an instruction entered by a user for enabling/disabling frame freezing scenario information saving; and enable or disable the information saving module according to the instruction for enabling/disabling frame freezing scenario information saving.

In a possible implementation, the apparatus further includes an intelligent power allocation enabling/disabling module configured to: receive an instruction entered by the user for enabling/disabling intelligent power allocation; and enable or disable the power allocation module according to the instruction for enabling/disabling intelligent power allocation.

In a possible implementation, the power allocation module is configured to: increase the power of the graphics processing unit based on a preset power adjustment value; and reduce the power of the other module based on the preset power adjustment value. Alternatively, the power allocation module is configured to: increase the power of the graphics processing unit based on a value of a preset power adjustment function; and reduce the power of the other module based on the value of the preset power adjustment function.

In a possible implementation, the power allocation module is further configured such that after a preset time of increasing the power of the graphics processing unit and reducing the power of the other module related to the displaying, the power allocation module restores the power allocated to the graphics processing unit and the other module to initial values. After this solution is used, a system is restored to an original state once the power bottleneck state is released.

According to a second aspect, an embodiment of this application provides a system for allocating power to a graphics processing unit. The system may include a graphics processing unit configured to process an image, and a control processor configured to: detect a frame rate of current image data to-be-displayed; determine whether the frame rate is lower than a preset frame rate threshold; if the frame rate is lower than the preset frame rate threshold, determine that displaying of the image data is in a frame freezing state; determine, in response to the frame freezing state, whether the graphics processing unit reaches a power bottleneck state; and if determining that the graphics processing unit reaches the power bottleneck state, increase power of the graphics processing unit and reduce power of another module related to the displaying.

In a possible implementation, a sum of the power of the graphics processing unit and the power of the other module related to the displaying does not exceed a preset power upper limit. Optionally, the preset power upper limit is determined by a battery temperature, system temperature, or board temperature of an apparatus that is collected by a sensor.

In a possible implementation, the other module includes at least one of the control processor, another processor, or a memory.

In a possible implementation, the control processor is configured to: compare a bound measure bound measure value of the graphics processing unit with a preset threshold; and when the bound measure value reaches the preset threshold, determine that the graphics processing unit reaches the power bottleneck state. The bound measure value is a parameter used to measure a load status of the graphics processing unit.

In a possible implementation, the system further includes the memory configured such that when the control processor determines that the displaying of the image data is in the frame freezing state, the memory records frame freezing scenario information. The frame freezing scenario information includes an execution time of an OpenGL API of a driver of the graphics processing unit, hardware counter hardware counter information, and open graphics library draw call (OpenGL draw call) in the frame freezing state.

Optionally, the memory or another memory in the system is configured to store a driver software code instruction of the control processor. The instruction is used to drive the control processor to perform various running functions mentioned above.

In a possible implementation, the control processor is further configured to: receive an instruction entered by a user for enabling/disabling frame freezing scenario information saving; and enable or disable, according to the instruction for enabling/disabling frame freezing scenario information saving, a function of recording the frame freezing scenario information.

In a possible implementation, the control processor is further configured to: receive an instruction entered by the user for enabling/disabling intelligent power allocation; and enable or disable, according to the instruction for enabling/disabling intelligent power allocation, a function of performing intelligent power allocation on the graphics processing unit.

In a possible implementation, the control processor is configured to: increase the power of the graphics processing unit based on a preset power adjustment value; and reduce, based on the preset power adjustment value, the power of the other module related to the displaying. Alternatively, the control processor is configured to: increase the power of the graphics processing unit based on a value of a preset power adjustment function; and reduce, based on the value of the preset power adjustment function, the power of the other module related to the displaying.

In a possible implementation, the control processor is further configured such that after a preset time of increasing the power of the graphics processing unit and reducing the power of the other module related to the displaying, the control processor restores the power allocated to the graphics processing unit and the other module to initial values.

According to a third aspect, an embodiment of this application provides a method for allocating power to a graphics processing unit. The method may include: detecting a frame rate of current image data to-be-displayed when an application program runs; if the frame rate is lower than a preset frame rate threshold, determining that displaying of the image data is in a frame freezing state; determining, in response to the frame freezing state, whether a graphics processing unit reaches a power bottleneck state; and if the graphics processing unit reaches the power bottleneck state, dynamically increasing power of the graphics processing unit and reducing power of another module related to the displaying.

In a possible implementation, a sum of the power of the graphics processing unit and the power of the other module related to the displaying does not exceed a preset power upper limit. Optionally, the preset power upper limit is determined by a battery temperature, system temperature, or board temperature of an apparatus that is collected by a sensor.

In a possible implementation, the other module includes a control processor and a memory.

In a possible implementation, the determining whether a graphics processing unit reaches a power bottleneck state includes: determining, based on a result of comparing a bound measure bound measure value of the graphics processing unit with a preset threshold, whether the graphics processing unit reaches the power bottleneck state; and when the bound measure value reaches the preset threshold, determining that the graphics processing unit reaches the power bottleneck state; or when the bound measure value does not reach the preset threshold, determining that the graphics processing unit does not reach the power bottleneck state. The bound measure value is determined based on voltage data and frequency data that are read in a driver of the graphics processing unit.

In a possible implementation, when determining that the displaying of the image data is in the frame freezing state, the method further includes recording frame freezing scenario information. The frame freezing scenario information includes an execution time of an OpenGL API of the driver of the graphics processing unit, hardware counter hardware counter information, and OpenGL draw call in the frame freezing state.

In a possible implementation, the method further includes: receiving an instruction entered by a user for enabling/disabling frame freezing scenario information saving; and enabling or disabling, according to the instruction for enabling/disabling frame freezing scenario information saving, a function of recording the frame freezing scenario information.

In a possible implementation, the method further includes: receiving an instruction entered by the user for enabling/disabling intelligent power allocation; and enabling or disabling, according to the instruction for enabling/disabling intelligent power allocation, a function of performing intelligent power allocation on the graphics processing unit.

In a possible implementation, the dynamically increasing power of the graphics processing unit and reducing power of another module related to the displaying includes: dynamically increasing the power of the graphics processing unit based on a preset power adjustment value and reducing, based on the preset power adjustment value, the power of the other module related to the displaying; or dynamically increasing the power of the graphics processing unit based on a value of a preset power adjustment function and reducing, based on the value of the preset power adjustment function, the power of the other module related to the displaying.

In a possible implementation, the method further includes: after a preset time of removing the power bottleneck state of the graphics processing unit, dynamically restoring the power allocated to the graphics processing unit and the other module to initial values.

According to a fourth aspect, an embodiment of this application provides an apparatus for allocating power to a graphics processing unit. The apparatus may include a processor, a memory, and a bus. The processor and the memory are connected to each other through the bus. The memory is configured to store a set of program code, and the processor is configured to call the program code stored in the memory, to perform the steps in any one of the first aspect or the implementations of the first aspect in the embodiments of this application. Optionally, the apparatus may further include a graphics processing unit.

According to a fifth aspect, an embodiment of this application provides a computer-readable storage medium. The computer-readable storage medium stores an instruction. When the instruction is run on a computer, the method in any one of the third aspect or the possible implementations of the third aspect is implemented.

BRIEF DESCRIPTION OF DRAWINGS

To describe the technical solutions in the embodiments of this application or in the background more clearly, the following briefly describes the accompanying drawings for describing the embodiments of this application or the background.

DESCRIPTION OF EMBODIMENTS

The following describes the embodiments of this application with reference to the accompanying drawings in the embodiments of this application. In the specification, claims, and accompanying drawings of this application, the terms "including", "having", and any other variants thereof are intended to cover a non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

Figure 1:
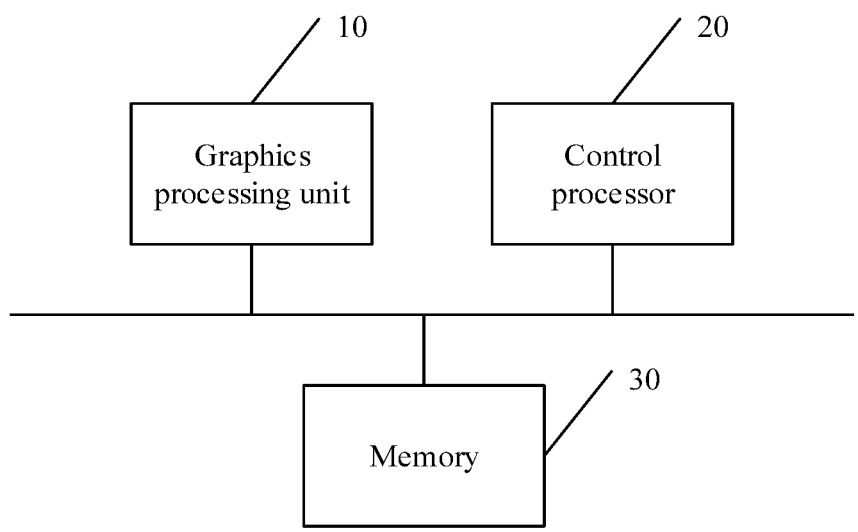
FIG. 1 is a schematic diagram of a framework of a system for allocating power to a graphics processing unit according to an embodiment of the present disclosure.

FIG. 1 is a schematic diagram of a framework of a power allocation system according to an embodiment of the present disclosure. The system framework may include a graphics processing unit (GPU) 10, a control processor 20, and a memory 30. The system framework may be applied to running of large-scale games, playing of high-definition videos, or another scenario in which complex image rendering needs to be performed. The system may be included in a device. The device may be a mobile terminal such as a mobile phone, a tablet computer, or a wearable device, or may be another device such as a desktop computer, a server, or a vehicle-mounted device. The system framework may be a system on a chip (SoC), or may be considered as a chip.

The GPU 10 is a most important component of a video card in a device such as a computer or a mobile terminal, and determines an image processing capability and image acceleration performance of the device. In this embodiment of this application, a GPU in a mobile terminal such as a smartphone or a tablet computer is mainly used as an example for description. Currently, the smartphone has a larger screen and a more powerful system, and provides more dazzling special effects for a game. A manner in which a conventional mobile phone processes an image only using a central processing unit (CPU) cannot meet a current development requirement of the smartphone. With rapid development of the smartphone in recent years, a three-dimensional (3D) acceleration chip adds powerful vitality to entertainment performance of the smartphone. The 3D acceleration chip can ensure smooth running of a variety of 3D games and 3D application programs. The graphics processing unit 10 may be responsible for necessary 3D processing, and may take over at least some image displaying functions from the CPU, and selectively provide auxiliary processing during video playing, video recording, and photographing. In this way, the CPU is freed to focus on pure instructions without having to deal with heavy image processing tasks. This greatly improves 3D performance of the system of the mobile phone. When a large-scale game application program runs, the graphics processing unit 10 generates a large amount of heat. Currently, a temperature of the smartphone is controlled mainly by controlling total output power of the system including the graphics processing unit 10.

As a control center of the device, the control processor 20 may execute various application programs, and read or call data collected or saved by another module (such as the graphics processing unit 10 or the memory 30) for processing and output, to manage and control the other module. The control processor 20 may be a central processing unit, or may be a processor of another type, for example, a digital signal processor (DSP), an application-specific integrated circuit (ASIC), a microprocessor, or a microcontroller. In this embodiment of this application, a CPU in a mobile terminal such as a smartphone or a tablet computer is mainly used as an example for description. The CPU is a central control system of the mobile terminal and also a control center of a logic part. The CPU may implement control by running software in the memory 30 and calling a database in the memory 30. The CPU may have one or more cores, for example, may be a relatively common dual-core processor, a quad-core processor, or even an octa-core processor. To reduce power consumption of the mobile terminal, the CPU includes a big core and a small core. When a user runs different application programs, a core used to run an application program may be selected based on a performance requirement of the application program and the power consumption of the terminal.

The memory 30 may include a volatile memory such as a random access memory (RAM), or a non-volatile memory such as a read-only memory (ROM) or a flash memory, or may include various caches such as a first in first out (FIFO) memory or a first in last out (FILO) memory. The memory 30 may provide an instruction and data for the control processor 20. A mobile terminal is used as an example. The memory 30 may be configured to: when the mobile terminal runs, load an operating system and application software and buffer data and an instruction that are to be processed by a CPU; or may be configured to permanently store the operating system and the application software.

In this embodiment of this application, the graphics processing unit 10 may be configured to process an image. For example, the graphics processing unit 10 may process to-be-displayed image data of various application programs. The application programs include game applications, video playing applications, or other applications involving a large amount of image processing.

The control processor 20 may be configured to: detect a frame rate of current image data to-be-displayed; determine whether the frame rate is lower than a preset frame rate threshold; if the frame rate is lower than the preset frame rate threshold, determine that displaying of the image data is in a frame freezing state; determine, in response to the frame freezing state, whether the graphics processing unit reaches a power bottleneck state; and if determining that the graphics processing unit 10 reaches the power bottleneck state, increase power of the graphics processing unit 10, and reduce power of another module related to the displaying, in other words, perform power re-allocation. Optionally, a sum of the power of the graphics processing unit 10 and the power of the other module related to the displaying does not exceed a preset power upper limit. This can ensure stability of the entire system and provide good device temperature control and management. Optionally, the other module may include but is not limited to at least one of the control processor 20, another processor, or the memory 30. The frame freezing state is a displaying status of the image data when the frame rate is lower than the preset frame rate threshold. In this case, the frame rate related to the displaying is considered to be excessively low, and therefore a displayed image is not smooth. However, there may be many causes for such un-smoothness, and the un-smoothness may not necessarily be caused by the graphics processing unit. To further accurately identify a cause, whether the graphics processing unit reaches the power bottleneck state needs to be further determined. A two-step determining method can be used to accurately identify the cause for frame freezing and properly implement power re-allocation or adjustment.

It should be noted that the foregoing functions such as frame rate detection, determining of the frame freezing state, determining of the power bottleneck state of the graphics processing unit 10, and power adjustment may be implemented by the control processor 20. The control processor 20 may include a CPU, for example, a CPU that runs an operating system. The control processor 20 may further include another controller other than the CPU that runs the operating system. For example, in an Android system, the CPU may run the Android system and various application programs, and another processor is separately configured to implement the foregoing functions of the control processor 20. This is not limited in this application.

When determining whether the graphics processing unit 10 is in the power bottleneck state, the control processor 20 is configured to: compare a bound measure bound measure value of the graphics processing unit 10 with a preset threshold; and when the bound measure value reaches the preset threshold, determine that the graphics processing unit 10 reaches the power bottleneck state; or when the bound measure value does not reach the preset threshold, determine that the graphics processing unit 10 does not reach the power bottleneck state, and skip performing subsequent power adjustment. The bound measure value is a parameter used to measure a load status of the graphics processing unit 10. The bound measure value may be obtained through calculation based on at least one type of the following data, of the graphics processing unit 10, obtained by a driver of the graphics processing unit 10: an operating frequency, an operating voltage, an operating current, or an operating time. For example, the bound measure value is a parameter value obtained through comprehensive calculation based on the operating frequency, the operating voltage, the operating current, and the operating time. The control processor 20 may obtain the foregoing data from the graphics processing unit 10, and then calculate the bound measure value based on the data.

To help research and development personnel analyze a frame freezing scenario, the control processor 20 may record frame freezing scenario information into the memory 30 or another memory when determining that the displaying of the image data is in the frame freezing state. The frame freezing scenario information may include but is not limited to an execution time of an open graphics library (OpenGL) application programming interface (API) of the driver of the graphics processing unit 10, hardware counter hardware counter information of the graphics processing unit 10, and open graphics library draw call (OpenGL draw call) in the frame freezing state.

Optionally, when the frame freezing scenario information is recorded, information about a current frame may be recorded, or information about the first n frames including a current frame may be recorded, where n is an integer greater than 0. The frame freezing scenario information may be obtained by the control processor 20 from the graphics processing unit 10 and saved to the memory 30 or the other memory. Alternatively, the control processor 20 may send an information storage instruction to the graphics processing unit 10 and the memory 30 or the other memory, to indicate the graphics processing unit 10 to output the foregoing data to the memory 30 or the other memory for storage.

A function of recording the frame freezing scenario information is added to the control processor 20. In this way, when frame freezing occurs, related information about the driver of the graphics processing unit 10 and a specific displayed image in the frame freezing state can be recorded. This helps development personnel extract frame freezing data for analysis, quickly locate a problem, optimize the driver and image displaying, and effectively resolve the frame freezing problem.

Optionally, to flexibly use the function of recording the frame freezing scenario information and a function of performing intelligent power allocation, the corresponding functions may be enabled or disabled. In this case, the control processor 20 may be further configured to: receive an instruction entered by a user for enabling/disabling frame freezing scenario information saving, and enable or disable, according to the instruction for enabling/disabling frame freezing scenario information saving, the function of recording the frame freezing scenario information. In addition, the control processor 20 may be further configured to: receive an instruction entered by the user for enabling/disabling intelligent power allocation; and enable or disable, according to the instruction for enabling/disabling intelligent power allocation, the function of performing intelligent power allocation on the graphics processing unit.

During power adjustment, the control processor 20 may be configured to: increase the power of the graphics processing unit 10 based on a preset power adjustment value, and reduce, based on the preset power adjustment value, the power of the other module related to the displaying; or increase the power of the graphics processing unit 10 based on a value of a preset power adjustment function, and reduce, based on the value of the preset power adjustment function, the power of the other module related to the displaying.

In addition, to balance power allocation among various modules, optionally, the control processor 20 may be further configured to: after a preset time of increasing the power of the graphics processing unit 10 and reducing the power of the other module related to the displaying, restore the power allocated to the graphics processing unit 10 and the other module to initial values. The preset time herein may be defined before the device is delivered from a factory, selected by the user from several options provided, or defined by the user. This is not limited in the embodiment of this application.

It should be noted that, when frame freezing occurs during the displaying, it indicates that performance or power of a module related to the displaying is insufficient. The total output power of the system may be reduced in a temperature control scenario, and a module that is strongly correlated to the displaying is the graphics processing unit 10. Therefore, in this case, a power status of the graphics processing unit 10 may be first detected, to determine whether the graphics processing unit 10 reaches the power bottleneck state. If the graphics processing unit 10 reaches the power bottleneck state, the power of the graphics processing unit 10 is increased and the power of the other module is reduced. If the graphics processing unit 10 does not reach the power bottleneck state, a power status of the other module related to the displaying may be further detected. Actually, the control processor 20 or the memory 30 may also reach the power bottleneck state. This may also cause frame freezing. Therefore, when it is detected that the control processor 20 reaches the power bottleneck state, power of the control processor 20 may be increased, and power allocated to another module may be reduced. Similarly, if it is detected that the memory 30 reaches the power bottleneck state, power of the memory 30 may be increased, and power allocated to another module may be reduced.

In this embodiment of this application, the preset frame rate threshold is configured to detect the frame freezing state of the displaying, and the power bottleneck state of the graphics processing unit 10 is further detected. When the graphics processing unit 10 is in the power bottleneck state, the power of the graphics processing unit 10 is increased and the power allocated to the other module is reduced, in other words, power re-allocation is performed. In this embodiment, the total output power of the system is not increased, an energy consumption rating is reduced, a power waste is reduced, the frame freezing scenario during the displaying can be quickly and effectively detected, and the frame freezing problem is resolved by increasing the power of the graphics processing unit 10. This improves an average frame rate and smoothness of an application program, and helps the user obtain good experience in using the application program. There are many causes for the frame freezing state. Therefore, even if frame freezing occurs, accuracy of identifying a cause for frame freezing can be improved by further detecting whether the graphics processing unit 10 is in the power bottleneck state, to perform corresponding adjustment.

An example in which the control processor 20 is a CPU that runs the Android system is used below to describe in detail an apparatus for allocating power to the graphics processing unit in this embodiment of this application with reference to FIG. 2 to FIG. 4. A main power allocation function of the apparatus may be implemented by the CPU. It may be understood that power allocation may alternatively be implemented by a processor other than the CPU running the Android system, and this embodiment is merely an example. The apparatus for implementing power allocation may be implemented by software and run on the CPU. Before power allocation, the apparatus for implementing power allocation may obtain some data when the graphics processing unit 10 works, to determine an operating status of the graphics processing unit 10, and adjust the power of the graphics processing unit 10 based on a determining result. Optionally, functions of the apparatus for implementing power allocation may include but are not limited to frame rate detection of to-be-displayed data, frame freezing scenario identification, bottleneck status detection of the graphics processing unit 10, intelligent power allocation (IPA), and the like during running of an application program. Optionally, the apparatus for implementing power allocation may be further configured to record frame freezing scenario information, and has corresponding enabling/disabling modules for enabling or disabling a function of recording the frame freezing scenario information and a function of performing IPA. An IPA technology can be used to monitor a current temperature of the entire system, for example, the SoC, and then dynamically allocate power to each part based on a big core and a small core in the CPU and a power level of the graphics processing unit 10. In the technology, the power of each part is estimated using an algorithm, and it is measured whether the power of each part is within a rated performance range. Subsequently, performance beyond the rated performance range is adjusted to keep the SoC at a normal heat level. In this embodiment of this application, the IPA technology is further improved to avoid frame freezing during image displaying in the temperature control scenario.

Figure 2:
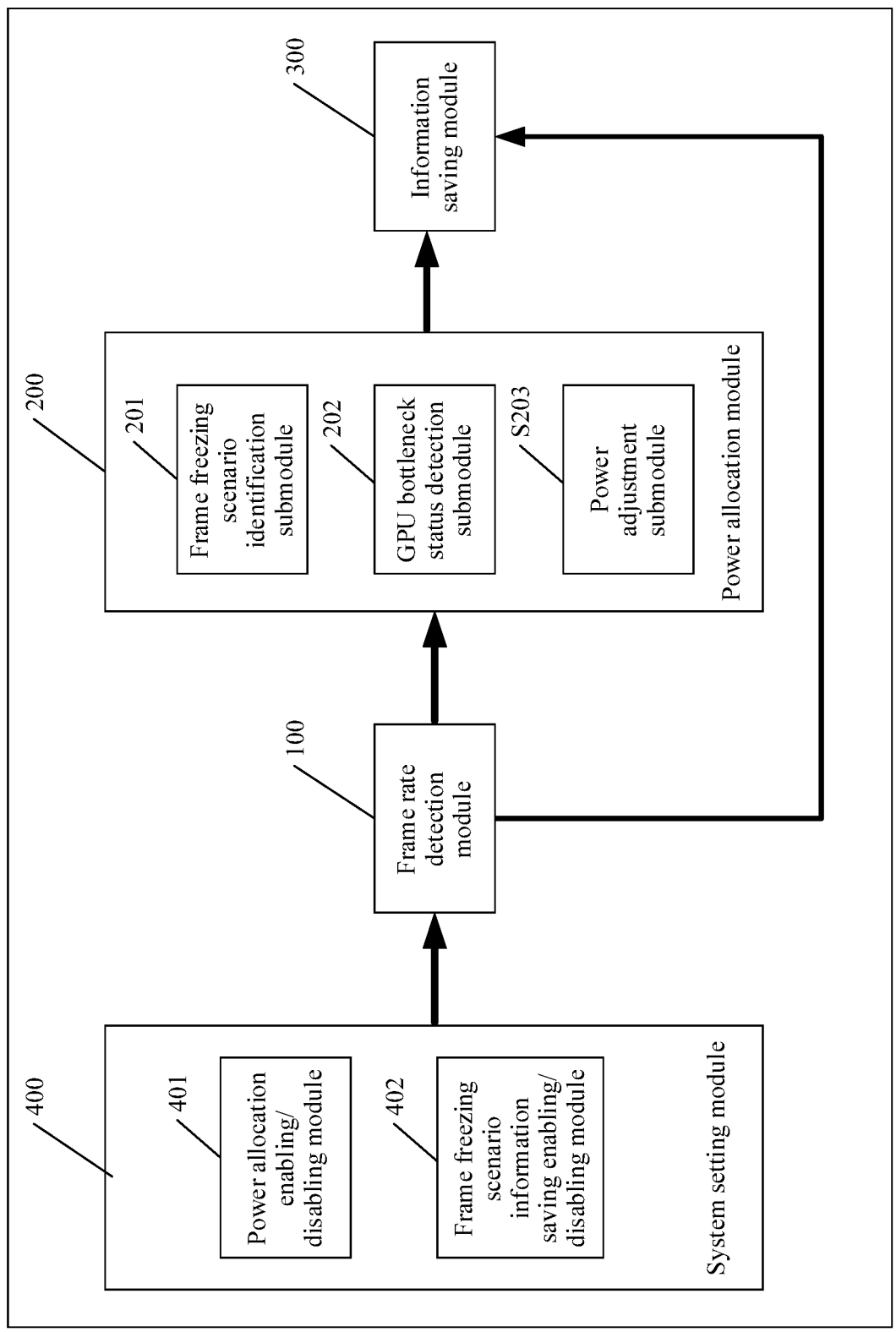
FIG. 2 is a schematic diagram of composition of an apparatus for allocating power to a graphics processing unit according to an embodiment of the present disclosure.

FIG. 2 is a schematic diagram of composition of an apparatus for allocating power to a graphics processing unit according to an embodiment of the present disclosure. The apparatus may be implemented by a CPU by running a software driver instruction, and includes a frame rate detection module 100. A function of the frame rate detection module 100 may be implemented using the CPU, and a program corresponding to the function of the frame rate detection module 100 may run on the CPU. The frame rate detection module 100 is configured to detect a frame rate of current image data to-be-displayed. The apparatus further includes a power allocation module 200. A function of the power allocation module 200 may also be implemented using the CPU, and a program corresponding to the function of the power allocation module 200 may run on the CPU. The power allocation module 200 may be configured to: determine whether the frame rate is lower than a preset frame rate threshold; if the frame rate is lower than the preset frame rate threshold, determine that displaying of the image data is in a frame freezing state; determine, in response to the frame freezing state, whether a graphics processing unit 10 reaches a power bottleneck state; and if determining that the graphics processing unit 10 reaches the power bottleneck state, increase power of the graphics processing unit 10, and reduce power of another module related to the displaying. If the frame rate is not lower than the preset frame rate threshold, it is determined that the displaying of the image data is not in the frame freezing state, and no operation is performed. If it is determined that the graphics processing unit 10 does not reach the power bottleneck state, the adjustment is not performed, in other words, original power allocation is maintained.

A scenario in which an Android system is used and a game application program runs is used as an example. The frame rate detection module 100 may include components shown in FIG. 3. FIG. 3 is a schematic diagram of composition of the frame rate detection module 100. A SurfaceFlinger in a SurfaceFlinger&BufferQueue 101 is a service program running in a system process of the Android system, and is responsible for drawing an interaction interface of an Android application program. A BufferQueue in the SurfaceFlinger&BufferQueue 101 is a service program of an Android user interface system and resides in a SurfaceFlinger process to provide a service. A frames per second (FPS) counter (FpsCounter) 102 is a frame rate detection program. An iMonitor 103 is a program for monitoring a mobile phone status, and may monitor status data such as a temperature, performance, and a frame rate of a mobile phone. A system trace (Systrace) 104 is a performance analysis tool of the Android system. A GPU driver development kit (DDK) 105 outside the frame rate detection module 100 is a driver software program used by the graphics processing unit 10 for drawing and rendering, and runs on the graphics processing unit 10. In this embodiment of this application, the FpsCounter 102 may obtain an application program whitelist and the preset frame rate threshold from a configuration file stored in a memory 30 or another memory, and determine, based on the preset frame rate threshold, whether a current program is in the frame freezing state. In the Android system, a BufferQueue service is called when each displayed frame is updated. Therefore, the frame rate detection program FpsCounter 102 may be added on a basis of the BufferQueue service. The FpsCounter 102 collects statistics on the frame rate of the to-be-displayed image data by calling a quantity, recorded by the BufferQueue module, of times that a frame of a displayed image is called, and then calls the iMonitor 103 interface to save a Systrace file. The FpsCounter 102 can also take a screenshot when the displaying is in the frame freezing state. In the foregoing operations, an indication message is sent to the iMonitor 103, and the iMonitor 103 sends an indication for saving the Systrace file or taking the screenshot to the Systrace 104. The frame rate detection module 100 may further obtain some data about an operating status of the graphics processing unit 10 from the GPU DDK 105, and save the data in the Systrace file. The Systrace file may be output to the memory 30 or directly output to another memory or device outside the system. The device can run some test tools such as HiZee (a game test tool). HiZee can analyze and extract Systrace data offline and provide a report for a user to view.

Optionally, the preset frame rate threshold may be pre-configured by a terminal vendor, may be selected by the user from several options pre-configured by a terminal vendor, or may be defined by the user. This is not limited in this embodiment of this application. In addition, a same frame rate threshold or different frame rate thresholds may be configured for different application programs. This is not limited in this embodiment of this application. For example, the user may preset frame rate thresholds of all game applications to 30 frames/second at which a relatively good displaying effect is achieved, or may set a first frame rate threshold of 60 frames/second for a game application A with a relatively good game image, and set a second frame rate threshold of 30 frames/second for a game application program B with relatively good game operability. After the frame rate threshold is set, a terminal saves the setting information in a configuration file in the memory 30 or the other memory, and directly calls the setting information if required. During implementation, the CPU may collect statistics on a frame rate of to-be-displayed image data in a game by calling a quantity of frame calling times of the BufferQueue.

Optionally, the apparatus may further include an information saving module 300 and a system setting module 400. A function of the information saving module 300 and a function of the system setting module 400 may also be implemented by the CPU, and programs corresponding to the functions may run on the CPU. The information saving module 300 may be configured to: when it is determined that the displaying of the image data is in the frame freezing state, record frame freezing scenario information. The frame freezing scenario information includes an execution time of an open graphics library (OpenGL) application programming interface (API) of a driver of the graphics processing unit, hardware counter hardware counter information of the graphics processing unit, and OpenGL draw call in the frame freezing state.

The saving module 300 in FIG. 2 is an independent module. Alternatively, the saving module 300 may be embedded into the Systrace 104 in FIG. 3. In this case, the iMonitor 103 and the Systrace 104 in FIG. 3 may not be a part of the frame rate detection module 100 in FIG. 2, but be located outside the frame rate detection module 100. In this case, the Systrace 104 may include the saving module 300 configured to save the frame freezing scenario information. Alternatively, the Systrace 104 may be equivalent to the saving module 300. The Systrace 104 generates the Systrace file while performing performance analysis and statistics. The Systrace file may include the frame freezing scenario information and other information such as a screenshot. Therefore, the Systrace 104 further saves the frame freezing scenario information in the memory 30 or the other memory, for example, an external storage device of the system.

An OpenGL is a professional graphic program interface that defines a specification of a cross-programming-language and cross-platform programming interface. The OpenGL is used for a three-dimensional image (or a two-dimensional image), and is a powerful and easy-to-call underlying graphics library. Draw Call indicates a drawing quantity of OpenGL. APIs are predefined functions. The API provides application programs and development personnel with a capability of accessing a set of routines based on software or hardware, without accessing source code, or is used to understand details about an internal operating mechanism of software or hardware. The frame freezing scenario information is provided by the graphics processing unit 10 for the information saving module 300 run by a control processor 20. The information saving module 300 may save an execution status of an application program in a dump file using a debugger. The dump file is a memory image of a process. The dump file may be used by a driver programmer to debug a driver. This type of file needs to be opened using a dedicated tool or dedicated software, for example, Windows Debugger (WinDbg).

The system setting module 400 may be configured to set enabling/disabling of a function of the system. The function of the system setting module 400 may be implemented using the CPU. A program corresponding to the function may run on the CPU. Optionally, the system setting module 400 may include a frame freezing scenario information saving enabling/disabling module 401, configured to: receive an instruction entered by the user for enabling/disabling frame freezing scenario information saving, and enable or disable the information saving module 300 according to the instruction for enabling/disabling frame freezing scenario information saving. The system setting module 400 further includes an intelligent power allocation enabling/disabling module 402, configured to: receive an instruction entered by the user for enabling/disabling intelligent power allocation, and enable or disable the power allocation module 200 according to the instruction for enabling/disabling intelligent power allocation.

If the current displaying is in the frame freezing state and a function of saving the frame freezing scenario information is enabled, the system requests the iMonitor 103 to save the Systrace 104. The graphics processing unit 10 writes, into the Systrace 104 file, an execution time of the OpenGL API, hardware counter information, OpenGL draw calls, and the like recorded in the GPU DDK 105 when latest several frames run, to analyze a cause for frame freezing during the displaying. For example, if the execution time of the OpenGL API is too long, a voltage or a frequency of the graphics processing unit 10 in the hardware counter information is too low, or the OpenGL draw call is too large, frame freezing may occur. Engineering personnel may determine, based on the saved information, the cause for frame freezing during the displaying.

After frame freezing occurs during the displaying, the power allocation module 200 may detect a bottleneck status of the graphics processing unit 10, and dynamically adjust the power of the graphics processing unit 10 when the graphics processing unit 10 is in the power bottleneck state. During implementation, the foregoing functions may be completed by the CPU. For example, when the CPU determines that the frame freezing state occurs, the CPU may execute functions of the apparatus shown in FIG. 2, read the execution time of the OpenGL API, the hardware counter information, OpenGL draw call information from the GPU DDK 105, and write the read information into the memory 30 for storage. In addition, the CPU may enable or disable a corresponding function according to an enabling/disabling control instruction received from the user.

Figure 4:
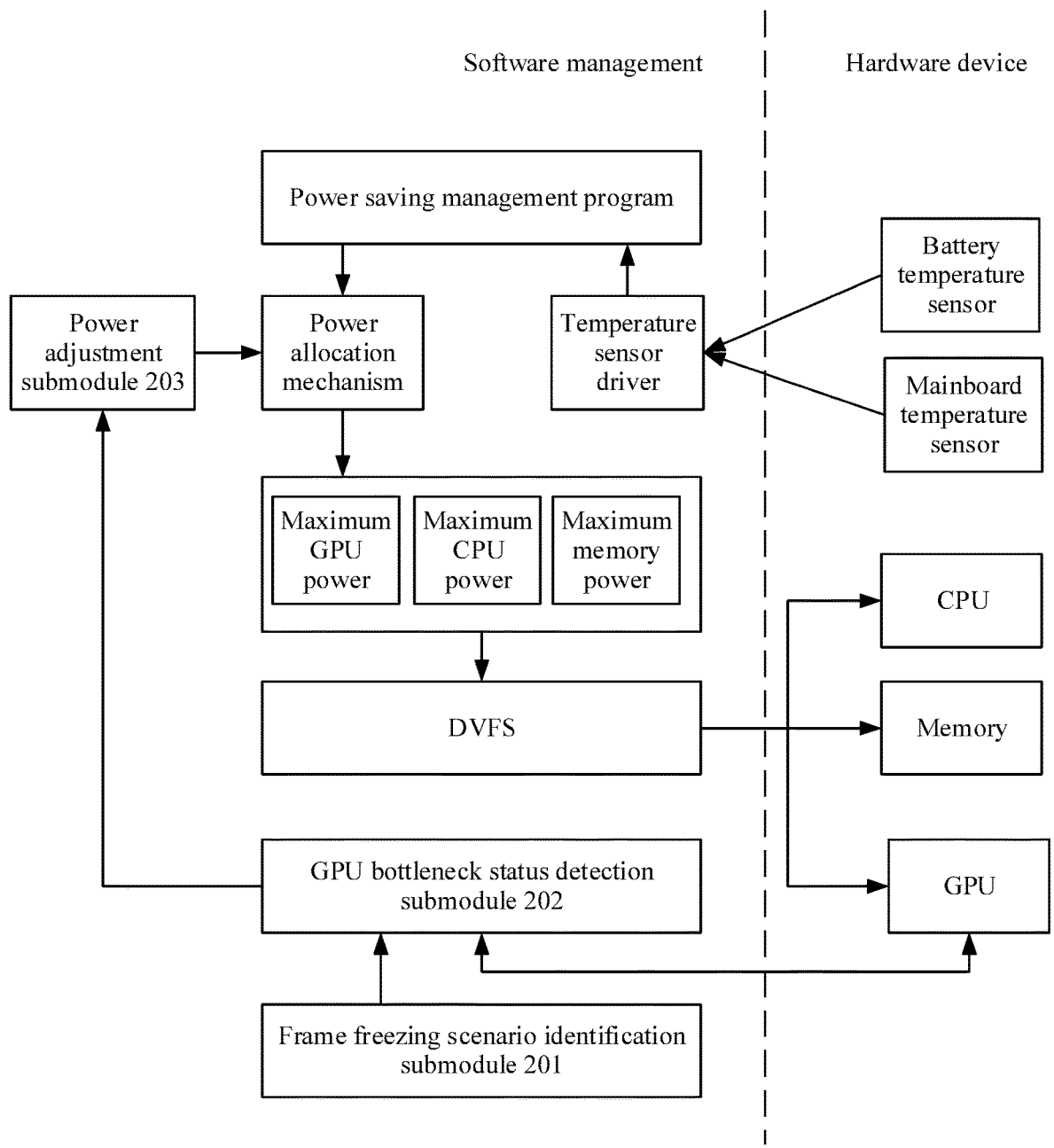
FIG. 4 is a schematic structural diagram of an intelligent power adjustment mechanism according to an embodiment of the present disclosure.

FIG. 4 is a schematic structural diagram of an intelligent power adjustment mechanism in this application. A hardware device in an embodiment of this application is shown on the right side of a vertical dashed line, and includes the control processor 20, namely, the CPU, the memory 30, and the graphics processing unit 10 shown in FIG. 1. A software management module in this embodiment of this application is shown on the left side of the vertical dashed line, and is implemented by an apparatus similar to the apparatus in FIG. 2.

A power saving management program is a type of temperature control software. The power saving management program changes total output power of a system based on a battery temperature and/or a mainboard temperature, and sets, based on a weight ratio (for example, 2:1) and the total output power of the system, maximum power of each module during dynamic voltage and frequency scaling. Therefore, in this embodiment of this application, a sum of power of the graphics processing unit 10 and power of another module related to displaying does not exceed a preset power upper limit, namely, the total output power of the system. It may be understood that the power saving management program may be controlled based on another factor in addition to a temperature. For example, the preset power upper limit is determined based on a user setting. This is not limited in this embodiment. The following provides description using an example in which the preset power upper limit is controlled based on the temperature. The power upper limit may dynamically vary with a temperature change.

A temperature sensor driver obtains temperature data of a battery temperature sensor and a mainboard temperature sensor, and then outputs the temperature data to the power saving management program. When the battery temperature and/or the mainboard temperature are/is relatively high, the power saving management program appropriately reduces the total output power of the system, in other words, reduces an upper limit of the total power, and allocates respective maximum power to the graphics processing unit 10 and the CPU based on a fixed weight according to a conventional power allocation mechanism. Optionally, in the power allocation mechanism, maximum power may be further allocated to another module such as the memory 30. Then, a dynamic voltage and frequency scaling (DVFS) program dynamically adjusts an operating frequency and voltage of a chip (for a same chip, a higher frequency means that a higher voltage is required) based on the allocated maximum power and requirements of different application programs running on the chip for a computing capability, to save energy. Optionally, the temperature sensor driver may further provide temperature data of another sensor for the power saving management program, such that the power saving management program sets the upper limit of the total power. The other temperature data includes but is not limited to SoC temperature data collected by a temperature sensor configured for an SoC.

The DVFS program performs power adjustment, and may be controlled by a power allocation module 200 and the power saving management program. As shown in FIG. 4, a power adjustment submodule 203 in the power allocation module 200 and the power saving management program are configured to perform power adjustment, that is, output respective adjustment information. The respective adjustment information is combined to form a power allocation mechanism, and the power allocation mechanism is transmitted to the DVFS program, such that the DVFS program performs power adjustment. As shown in FIG. 4, for example, the power allocation mechanism includes the power of the graphics processing unit 10, power of the CPU, and power of the memory 30. For example, for the power allocation mechanism, the power saving management program is configured to control initial power of the graphics processing unit 10, the CPU, and the memory 30. Generally, the initial power of the graphics processing unit 10, the CPU, and the memory 30 does not exceed maximum power of the graphics processing unit 10, the CPU, and the memory 30 respectively, or a sum of the initial power of the graphics processing unit 10, the CPU, and the memory 30 does not exceed a sum of maximum power of the graphics processing unit 10, the CPU, and the memory 30, namely, an upper system power limit. The power adjustment submodule 203 is configured to perform power adjustment based on the initial power, in other words, perform power re-allocation on a basis that the power upper limit is satisfied, for example, perform IPA. The power adjustment submodule 203 may restore power of each device to initial power at an appropriate moment, for example, after a preset time of performing power re-allocation.

Figure 3:
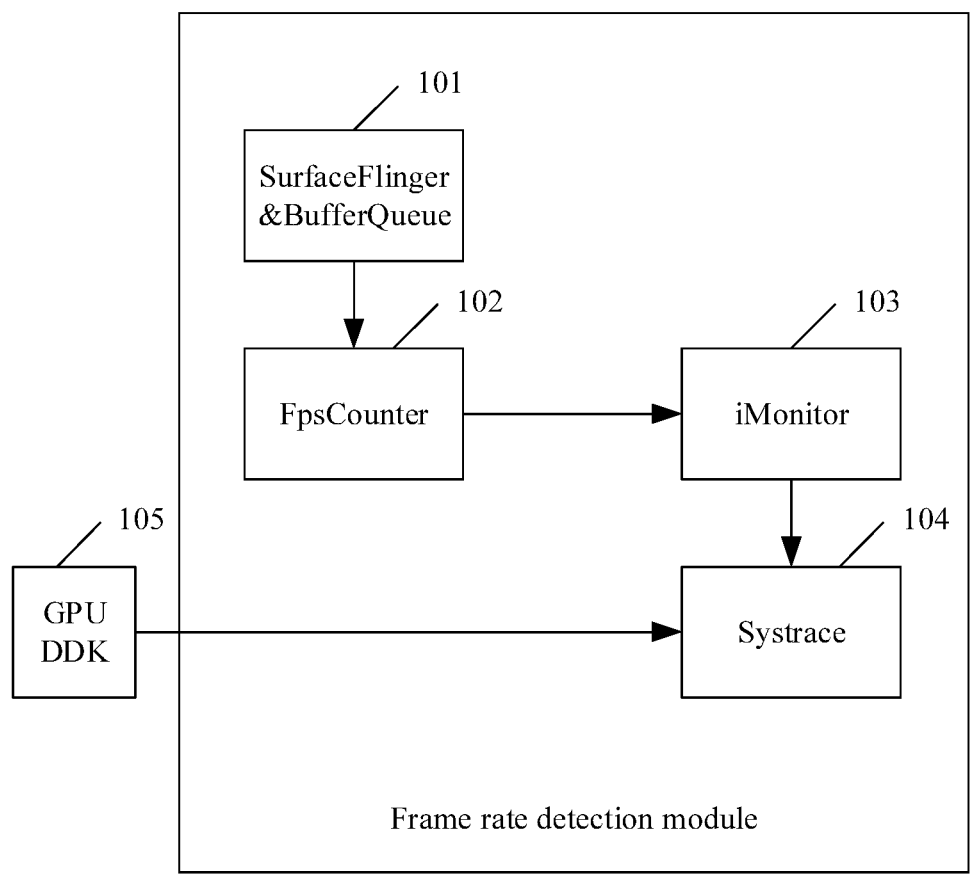
FIG. 3 is a schematic diagram of composition of a frame rate detection module according to an embodiment of the present disclosure.

For example, with reference to FIG. 3 and FIG. 4, when frame freezing occurs during displaying, the power allocation module 200 in this embodiment of this application dynamically adjusts the conventional power allocation mechanism under function of the power saving management program. First, a frame freezing scenario identification submodule 201 determines, based on frame rate information provided by a frame rate detection module 100, whether frame freezing occurs, and then triggers, when frame freezing occurs, a bottleneck status detection submodule 202 of the graphics processing unit 10 to detect the graphics processing unit 10. In a detection process, a hardware counter in the bottleneck status detection submodule 202 is used as a data statistics program of the graphics processing unit 10, and may obtain some related data in a driver of the graphics processing unit 10, for example, an operating frequency, an operating voltage, an operating current, and an operating time of the graphics processing unit 10. A GPU bound detector in the bottleneck status detection submodule 202 is used as a bottleneck status detection program of the graphics processing unit 10, and may calculate and determine a bound measure value of the graphics processing unit 10 based on the data obtained by the hardware counter, and then compare the bound measure value with a preset threshold. When the bound measure value reaches the preset threshold, it can be determined that the graphics processing unit 10 is in a power bottleneck state. Therefore, a power adjustment program in the power adjustment submodule 203 may be triggered to change the weight in the conventional power allocation mechanism, for example, from 2:1 to 2.5:0.5. When the bound measure value does not reach the preset threshold, it can be determined that the graphics processing unit 10 does not reach the power bottleneck state.

It should be noted that an apparatus in this embodiment of this application may use an IPA weight dynamic adjustment mechanism, that is, a function of the apparatus is embedded into an existing IPA temperature control system. When the battery temperature and/or the mainboard temperature are/is greater than a threshold, a temperature sampling frequency is increased. In this case, the upper system power limit is reduced. Each time a temperature is sampled, a power status of the graphics processing unit 10 is obtained. When the graphics processing unit 10 is in the power bottleneck state, a weight ratio indicating that power is preferentially allocated to the graphics processing unit 10 is used on a condition that the power upper limit is satisfied. When the graphics processing unit 10 is not in the power bottleneck state, a weight ratio indicating that power is fairly allocated to the graphics processing unit 10 and the CPU may be used under the condition that the power upper limit is satisfied. An IPA monitoring subprogram updates monitored mainboard temperature and/or battery temperature at a fixed period and detects the power bottleneck state of the graphics processing unit 10. Once the graphics processing unit 10 reaches the power bottleneck state, the IPA monitoring subprogram dynamically changes an allocation weight of the total output power of the system.

Optionally, in addition to a manner of directly changing the weight, maximum power allocated to each module may also be directly adjusted. For example, the power of the graphics processing unit 10 may be dynamically increased based on a preset power adjustment value, and the power of the other module related to the displaying may be reduced based on the preset power adjustment value; or the power of the graphics processing unit 10 may be dynamically increased based on a value of a preset power adjustment function, and the power of the other module related to the displaying may be reduced based on the value of the preset power adjustment function.

For example, the total output power of the system is 6000 milliwatts. According to the conventional power allocation mechanism, maximum power initially allocated to the graphics processing unit 10 is 3000 milliwatts, maximum power initially allocated to the CPU is 2000 milliwatts, and the preset adjustment value may be 500 milliwatts. When frame freezing occurs, the maximum power of the graphics processing unit 10 may be adjusted to 3500 milliwatts, and the maximum power of the CPU may be adjusted to 1500 milliwatts. Certainly, the preset power adjustment value herein may be a single number, or may be a sequence formed by a plurality of irregular numbers, for example, [500, 200, 100], where the first adjustment may be performed by 500 milliwatts, the second adjustment is performed by 200 milliwatts, and the third adjustment is performed by 100 milliwatts.

For another example, the preset power adjustment function may be provided, for example, $y=1/x$, where y is a power adjustment value, and x is a variable greater than 0. A value sequence and a value range of x may be preset, for example, may be from 0.0001 to positive infinity. The power adjustment value y may be calculated based on a value of x, and then allocation is performed based on y. x may be related to a quantity of power adjustments or another system parameter. For example, in the first adjustment, y is 1000 when x is 0.001. In the second adjustment, y is 500 when x is 0.002. In the third adjustment, y is 200 when x is 0.005. Power allocation is performed using a value of such a decreasing function. In this way, more power may be first allocated to a module in the power bottleneck state during initial dynamic allocation, to accelerate release of the power bottleneck state.

After a preset time of increasing the power of the graphics processing unit 10 and reducing the power of the other module related to the displaying, power allocated to the graphics processing unit 10 and the other module may be restored to initial values before adjustment. This ensures smooth power allocation in the entire system.

Optionally, power may be increased by increasing at least one of a clock frequency, an operating voltage, or an operating current. Likewise, the power may be reduced by reducing at least one of the clock frequency, the operating voltage, or the operating current. A specific power adjustment manner is not limited in this embodiment. In a typical example, as mentioned above in FIG. 4, the DVFS program may be configured to accept control from the power adjustment submodule 203 in the power allocation module 200 to perform power adjustment and allocation, to increase the power of the graphics processing unit 10 and reduce the power of the other module related to the displaying. For example, the DVFS program scales a voltage and an operating frequency. In this embodiment, the DVFS program is used as an independent module. During actual implementation, the DVFS program may alternatively be included in the power adjustment submodule 203, to become a part of the power allocation module 200. However, in an alternative embodiment, different from the DVFS program that is software in FIG. 4, the DVFS program can implement power adjustment functions such as scaling of a current, the voltage, and the operating frequency using dedicated hardware. In this case, the hardware is controlled by the power adjustment submodule 203 to perform power adjustment or allocation. This is not limited in this embodiment.

A function of each submodule included in the power allocation module 200 or a function of another software module may be implemented by the CPU, and a program corresponding to the function may run on the CPU.

Figure 5:
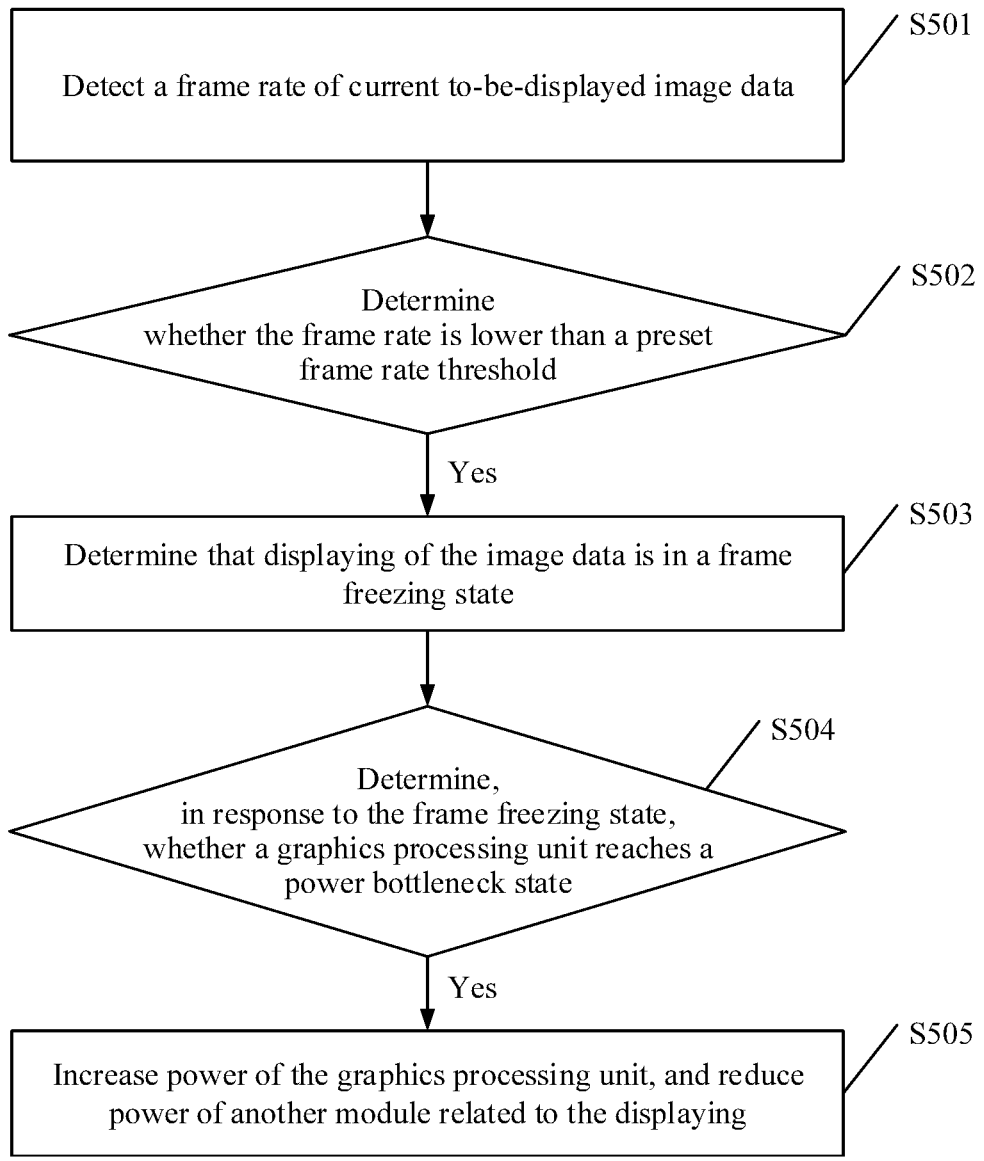
FIG. 5 is a schematic flowchart of a method for allocating power to a graphics processing unit according to an embodiment of the present disclosure.

FIG. 5 is a schematic flowchart of a method for allocating power to a graphics processing unit 10 according to an embodiment of the present disclosure. A mobile terminal is used as an example. A control processor 20 is a CPU. In addition to running the power allocation method, the CPU also runs an Android system and another application program. The application program consumes the calculation of the graphics processing unit 10. The method is executed by the CPU and includes the following steps. S501: Detect a frame rate of current image data to-be-displayed. S502: Determine whether the frame rate is lower than a preset frame rate threshold. S503: If the frame rate is lower than the preset frame rate threshold, determine that displaying of the image data is in a frame freezing state; otherwise, the process ends. S504: Determine, in response to the frame freezing state, whether the graphics processing unit reaches a power bottleneck state. S505: If the graphics processing unit reaches the power bottleneck state, increase power of the graphics processing unit, and reduce power of another module related to the displaying. If the graphics processing unit does not reach the power bottleneck state, the process ends, in other words, no adjustment is performed.

For concepts, explanations, and detailed descriptions related to the method and the technical solutions provided in the embodiments of this application, refer to descriptions of the content in the foregoing system, apparatus, or other embodiments. Details are not described herein again. In other words, different technical descriptions in different embodiments of this application may be mutually referenced.

A person skilled in the art may understand that for ease of description, only one memory and one processor are shown in the embodiments of this application. In an actual scenario, there may be a plurality of processors and a plurality of memories. The memory may also be referred to as a storage medium, a storage device, or the like. When there are a plurality of memories, the plurality of memories may be different types of memories. This is not limited in the embodiments of this application.

In an implementation process, the steps in the foregoing method can be implemented using a hardware integrated logic circuit in a processor, or using instructions in a form of software. The steps of the method disclosed with reference to the embodiments of this application may be directly performed by a hardware processor, or may be performed using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and a processor reads information in the memory and completes the steps in the foregoing method in combination with hardware of the processor. To avoid repetition, details are not described herein again.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A system for allocating power, comprising:
 a graphics processing unit (GPU) configured to process an image;
 a control processor coupled to the GPU and configured to:
  detect a frame rate of image data that are to be displayed, wherein the image data are associated with the image;
  determine whether the frame rate is lower than a preset frame rate threshold;

determine that a displaying status of the image data is in a frame freezing state when the frame rate is lower than the preset frame rate threshold;

determine, in response to the frame freezing state, whether the GPU has reached a power bottleneck state; and increase a first power of the GPU and reduce a second power of a module when the GPU has reached the power bottleneck state, wherein the module is related to the displaying status; and memory coupled to the control processor and configured to record frame freezing scenario information when the displaying status is in the frame freezing state, wherein the frame freezing scenario information comprises an execution time of an open graphics library (OpenGL) application programming interface (API) of a driver of the GPU, hardware counter information, and an OpenGL draw call in the frame freezing state.

2. The system of claim 1, wherein a sum of the first power and the second power does not exceed a preset power upper limit.

3. The system of claim 1, wherein the module comprises at least one of the control processor, another processor, or the memory.

4. The system of claim 1, wherein the control processor is further configured to:
compare a bound measure value of the GPU with a preset threshold; and
determine that the GPU reaches the power bottleneck state when the bound measure value reaches the preset threshold, wherein the bound measure value measures a load status of the GPU.

5. The system of claim 1, wherein the control processor is further configured to:
receive an instruction from a user for enabling or disabling frame freezing scenario information saving; and
enable or disable, according to the instruction, a function of recording the frame freezing scenario information.

6. The system of claim 1, wherein the control processor is further configured to:
receive an instruction from a user for enabling or disabling intelligent power allocation; and
enable or disable, according to the instruction, a function of performing intelligent power allocation on the GPU.

7. The system of claim 1, wherein the control processor is further configured to:
increase the first power based on a preset power adjustment value and reduce, based on the preset power adjustment value, the second power; or
increase the first power based on a value of a preset power adjustment function and reduce, based on the value of the preset power adjustment function, the second power.

8. The system of claim 1, wherein the control processor is further configured to restore power allocated to the GPU and the module to initial values after a preset time of increasing the first power and reducing the second power.

9. A method for allocating power to a graphics processing unit (GPU), the method comprising:
detecting a frame rate of image data that are to be displayed;
determining whether the frame rate is lower than a preset frame rate threshold;
determining that a displaying status of the image data is in a frame freezing state when the frame rate is lower than the preset frame rate threshold;
determining, in response to the frame freezing state, whether the GPU reaches a power bottleneck state;
increasing a first power of the GPU and reducing a second power of a module when the GPU has reached the power bottleneck state, wherein the module is related to the displaying status; and
recording frame freezing scenario information when determining that the displaying status is in the frame freezing state, wherein the frame freezing scenario information comprises an execution time of an open graphics library (OpenGL) application programming interface (API) of a driver of the GPU, hardware counter information, and OpenGL draw call in the frame freezing state.

10. The method of claim 9, wherein a sum of the first power and the second power does not exceed a preset power upper limit.

11. The method of claim 9, wherein the module comprises at least one of a control processor, another processor, or a memory.

12. The method of claim 9, wherein determining whether the GPU reaches the power bottleneck state comprises:
comparing a bound measure value of the GPU with a preset threshold; and
determining that the GPU reaches the power bottleneck state when the bound measure value reaches the preset threshold, wherein the bound measure value measures a load status of the GPU.

13. The method of claim 9, further comprising:
receiving an instruction from a user for enabling or disabling frame freezing scenario information saving; and
enabling or disabling, according to the instruction, a function of recording the frame freezing scenario information.

14. The method of claim 9, further comprising:
receiving an instruction from a user for enabling or disabling intelligent power allocation; and
enabling or disabling, according to the instruction, a function of performing intelligent power allocation on the graphics processing unit.

15. The method of claim 9, wherein increasing the first power and reducing the second power comprises:
increasing the first power based on a preset power adjustment value, and reducing, based on the preset power adjustment value, the second power; or
increasing the first power based on a value of a preset power adjustment function, and reducing, based on the value of the preset power adjustment function, the second power.

16. The method of claim 9, further comprising restoring power allocated to the GPU and the module to initial values after a preset time of increasing the first power and reducing the second power.

17. A non-transitory computer-readable storage medium configured to store instructions that, when executed by a computer, cause the computer to:
detect a frame rate of image data to be displayed;
determine whether the frame rate is lower than a preset frame rate threshold;
determine that a displaying status of the image data is in a frame freezing state when the frame rate is lower than the preset frame rate threshold;
determine, in response to the frame freezing state, whether the GPU reaches a power bottleneck state;

increase a first power of the GPU and reducing a second power of a module when the GPU has reached the power bottleneck state, wherein the module is related to the displaying status; and record frame freezing scenario information when determining that the displaying status is in the frame freezing state, wherein the frame freezing scenario information comprises an execution time of an open graphics library (OpenGL) application programming interface (API) of a driver of the GPU, hardware counter information, and OpenGL draw call in the frame freezing state.

18. The non-transitory computer-readable storage medium of claim 17, wherein a sum of the first power and the second power does not exceed a preset power upper limit.

19. The non-transitory computer-readable storage medium of claim 17, wherein the module comprises at least one of a control processor, another processor, or a memory.

20. The non-transitory computer-readable storage medium of claim 17, wherein the instructions are further configured to cause the computer to:

compare a bound measure value of the GPU with a preset threshold; and determine that the GPU reaches the power bottleneck state when the bound measure value reaches the preset threshold, wherein the bound measure value measures a load status of the GPU.

* * * * *